US005614290A

United States Patent [19]

Yamaguchi

[11] Patent Number: 5,614,290

[45] Date of Patent: Mar. 25, 1997

[54] METHOD AND APPARATUS FOR DISPLAYING COLOR IMAGE

[75] Inventor: Chiseki Yamaguchi, Tokyo, Japan

[73] Assignee: NEC Corporation, Tokyo, Japan

[21] Appl. No.: 394,968

[22] Filed: Feb. 27, 1995

[30] Foreign Application Priority Data

| | | | |
|---|---|---|---|
| Feb. 28, 1994 | [JP] | Japan | 6-030471 |
| May 18, 1994 | [JP] | Japan | 6-103688 |

[51] Int. Cl.$^6$ .......... B23B 9/00

[52] U.S. Cl. .......... 428/195; 428/203; 428/204; 428/205; 428/206; 428/207; 428/210; 437/51; 437/81; 437/86; 437/247; 349/20; 349/74; 349/106

[58] Field of Search .......... 428/195, 203, 428/204, 205, 206, 207, 210; 359/53, 67, 66, 68, 87, 43, 96, 99; 437/81, 51, 86, 247

[56] References Cited

U.S. PATENT DOCUMENTS

| | | | |
|---|---|---|---|
| 4,760,410 | 7/1988 | Kishi . | |
| 5,140,447 | 8/1992 | Kaneko et al. | 359/43 |
| 5,307,188 | 4/1994 | Dingwall et al. | 359/53 |
| 5,362,671 | 11/1994 | Zavradey et al. | 437/81 |

FOREIGN PATENT DOCUMENTS

| | | |
|---|---|---|
| 0282659 | 9/1988 | European Pat. Off. . |
| 0456500 | 11/1991 | European Pat. Off. . |
| 59-229578 | 12/1984 | Japan . |
| 61-290479 | 12/1986 | Japan . |

OTHER PUBLICATIONS

Patent Abstracts of Japan, Abstract of JP–A 59–042 578.
Patent Abstracts of Japan, Abstract of JP–A 59–229 578.

*Primary Examiner*—Patrick Ryan
*Assistant Examiner*—Abraham Bahta
*Attorney, Agent, or Firm*—Sughrue, Mion, Zinn, Macpeak & Seas

[57] ABSTRACT

A color image is displayed by using a display panel with a color pattern layer which is formed on one side of a transparent substrate and has, for example, three separate sets of transparent pixel areas in red, green and blue colors which constitute a regularly repetitive pattern and a set of opaque band-like areas by which each pixel area is bordered. An opaque toner is applied to the opposite side of the transparent substrate in areas opposite to selected pixel areas of the color pattern layer, and the display panel is backlighted from the side on which the color pattern layer exists. A clear color image appears when the backlighted display panel is viewed from the opposite side.

12 Claims, 10 Drawing Sheets

METHOD AND APPARATUS FOR DISPLAYING COLOR IMAGE

BACKGROUND OF THE INVENTION

This invention relates to a method of displaying a color image based on image information in the form of electrical signals and a display apparatus using the method of the invention. This invention uses a display panel having at least two sets of pixels in different colors which constitute a regularly repetitive pattern and applies a coloring substance such as a powder toner to selected areas of the display panel.

For displaying the outputs of computers, facsimiles, scanners, etc., it is prevailing to use electrically driven display apparatus such as CRTs, liquid crystal displays, plasma displays and LED displays. A common advantage of these displays is using no mechanically movable parts. However, these displays are not well suited to the display of a still image for long hours, and these displays become very costly when the screen size is enlarged.

There are some proposals of displaying images on a photosensitive or dielectric sheet in the form of belt by selective application of a coloring substance such as a powder toner to the photosensitive or dielectric sheet. By this method it will be relatively easy to produce wide-screen display apparatus or to display still images. However, there are several problems such as high cost of processing the photosensitive belt, unstable running of the belt, durability of the photosensitive belt, difficulty in displaying color images and darkness of the display screen.

Besides, there are proposals of display apparatus using a magnetic coloring substance in the pixels to display images by selective inversion or migration of the magnetic substance. However, such apparatus are not suited to display of color images and also suffer from darkness of the screen.

JP 59-229578 A shows a different method for displaying color images. The method uses an insulating sheet in the form of belt as the display screen base, and three sets of pixels in three different colors such as red, green and blue are formed on the insulating sheet so as to make a color pattern such as a mosaic pattern or a striped pattern, and each pixel is provided with an electrode. While the display screen is moved, a voltage is selectively applied between the electrodes in the pixels and a number of needle-like electrodes fixed opposite to the display screen in order to electrically charge selected pixels. Then the charged pixels are hidden by a toner, so that the unhidden pixels form a color image.

The method of JP 59-229578 A has several problems. It entails high cost and troublesome operations to form the pixels having electrodes. It is not easy to realize accurate alignment of the pixels in the moving display screen and the fixed needle-like electrodes. The display screen in the form of belt is liable to deteriorate or become dusty by repeated driving. The adhesion of toner to the pixels is unfavorable for color reproducibility and durability of the display screen.

JP 61-290479 A proposes a drastic modification of the method of JP 59-229578 A to omit both the electrodes in the pixels and the fixed needle-like electrodes. According to the proposal, color pixels are formed on a photoconductive layer, and at least two kinds of optical narrow-band filters are provided on the opposite side. The color pixels are selectively charged by scanning with at least two light beams different in wavelength through the filters, and then a conductive toner powder is applied. This method is very complicated and costly and hence will be impracticable.

SUMMARY OF THE INVENTION

It is an object of the present invention to provide an improved method for displaying a color image on a display panel having at least two separate sets of color pixels in different colors which constitute a regularly repetitive color pattern by applying a coloring substance to selected areas of the display panel.

It is another object of the invention to provide an image display apparatus using the method according to the invention.

An image displaying method according to the invention comprises using a display panel which comprises a transparent substrate and a color pattern layer which is formed on one side of the transparent substrate and has a multiplicity of transparent pixel areas consisting of at least two separate sets of transparent pixel areas in different colors which constitute a regularly repetitive pattern and a set of regularly arranged opaque band-like areas by which each of the pixel areas is bordered, applying an opaque coloring substance to the opposite side of the substrate of the display panel in areas opposite to selected pixel areas of the color pattern layer, and backlighting the display panel from the side on which the color pattern layer exists.

When the backlighted display panel is viewed from the opposite side, light passing through the transparent pixel areas except the aforementioned selected pixel areas provides a color image.

An image display apparatus according to the invention comprises the display panel used in the above stated method, an image generating means for applying an opaque coloring substance to the aforementioned opposite side of the substrate of the display panel in areas opposite to selected pixel areas of the color pattern layer on the basis of externally supplied image data, a backlighting means for illuminating the display panel from the side on which the color pattern layer exists, and a carrier means for reciprocatively moving at least one of the display panel and the image generating means relative to the other.

In preferred embodiments of the invention a powder toner is used as the opaque coloring substance, and the toner is selectively applied to a dielectric surface of the substrate of the display panel by a well known electrostatic process. So, in the display apparatus the image generating means includes an electrostatic head to form an electric charge pattern, a toner applicator and a cleaning mechanism to remove the toner from the substrate of the display panel after displaying an image or before displaying a next image.

As to the display panel, it is preferred that the color pattern layer has red, green and blue pixel areas (all these pixel areas are transparent as mentioned above) each of which is bordered by black lines.

This invention is suited to display of still images and has advantages in many respects.

The display panel used in this invention can easily be fabricated at relatively low cost because the display panel has no electrodes and no functional parts, and it is easy to produce large-sized display panels. Maintenance and replacement of the display panel are also easy. The bordering of the transparent pixel areas by opaque lines relaxes the precision requirements for the color pattern and for the relative motion of the display panel and, for example, the aforementioned electrostatic head. Besides, by the existence of the opaque border lines the quality of displayed images improves in respect of sharpness and color reproduction. The opaque border lines cause slight lowering of the brightness of the display, but this is not a serious problem because the lowering can be compensated by merely augmenting the luminous intensity of the backlight source by about 5%.

In this invention, toner is not applied to the color pattern layer. This is very favorable for the durability of the color pattern layer. Besides, there is moderate tolerance for flatness of the color pattern layer.

By the invention full color images can be displayed by using only one kind of toner and by performing a simple process consisting of selective application of toner and backlighting. It is possible to continue displaying a color image for a long period of time by merely continuing backlighting. Since backlighting is employed the display apparatus can be used day and night, and indoors and outdoors. The backlighting from the color pattern side is effective for accurateness of color reproduction.

The toner applied to the display panel can easily be recovered and reused.

The use of a flat display panel is favorable for the construction of a display apparatus. In the apparatus according to the invention the mechanism for relative motion of the display panel and the image generating means becomes very simple because it suffices to perform linear and reciprocative motion.

DESCRIPTION OF THE PREFERRED EMBODIMENTS

Figure 1:
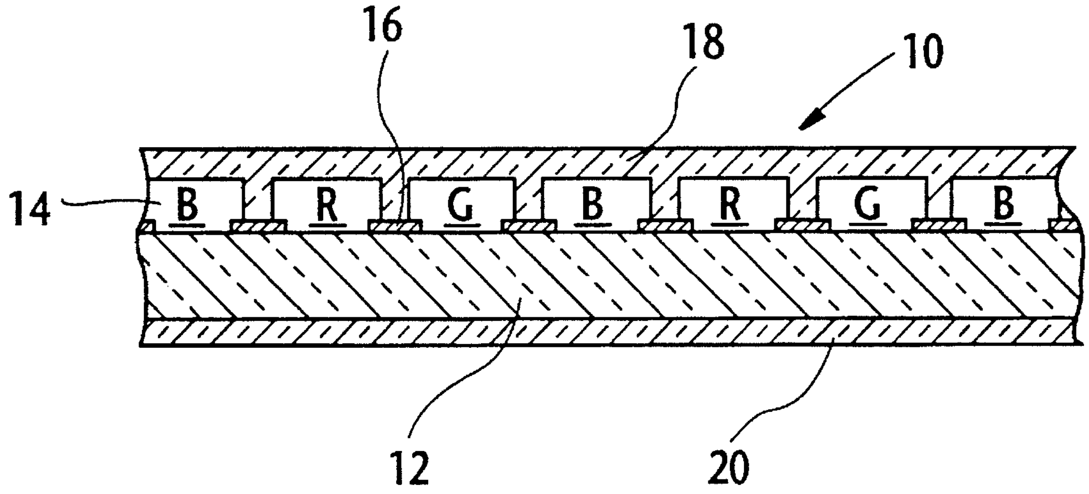
FIG. 1 is a cross-sectional view of a portion of a display panel used in this invention.
Figure 2:
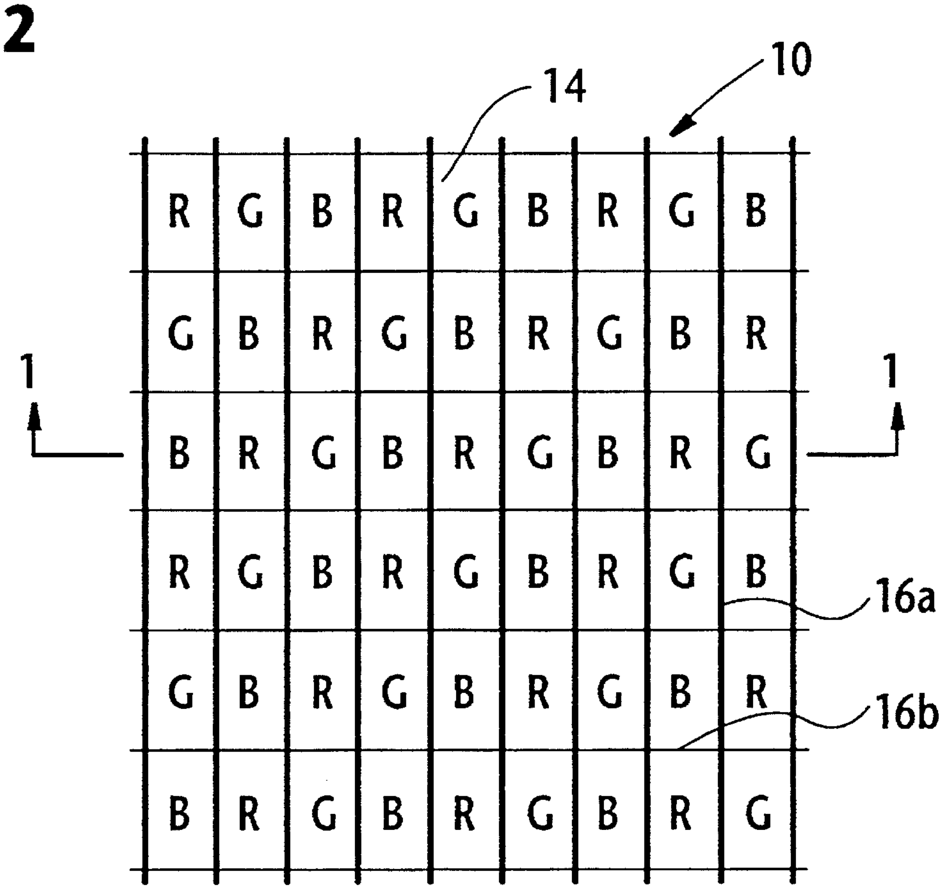
FIG. 2 shows an example of the color pattern of the pixels in the display panel of FIG. 1.

FIG. 1 shows the construction of a display panel 10 used in the invention. The display panel 10 has a transparent glass substrate 12, and a color pattern layer 14 is formed on one side of the glass substrate 12. The color pattern layer 14 is divided into a great number of transparent color areas consisting of red color areas R, green color areas G and blue color areas B by a lattice of opaque, black lines 16. That is, each of these color areas R, G, B is bordered by the black lines 16. The three sets of color areas R, G and B are distributed so as to make a regularly repetitive pattern of the three colors. As shown in FIG. 2, in this example the color areas R, G, B are rectangular areas arranged in a mosaic pattern. In this case the longitudinal black lines **16*a* are made thicker than the lateral black lines 16*b*, but this is an option. The longitudinal and lateral lines 16*a* and 16*b* may have the same thickness. Each of these color areas R, G, B is a pixel of the display panel 10. For example, each color area is from 50 to 200 μm in length and width, and the spacings between adjacent color areas are from 30 to 50 μm. In this example, each color area is 80 μm in width and 150 μm in length. The color pattern layer 14 including the black border lines 16 is overlaid with a transparent protective layer 18. The color pattern layer 14** can be formed by a conventional technique to form color coatings on glass sheet. For example, organic dyes or pigments are applied by dying process, dispersing process, printing process or electrodeposition process, or inorganic coatings are made in the manner of interferential multilayer coating. If necessary it is possible to employ a combination of two or more different techniques.

On the opposite side of the glass substrate 12 there is a transparent dielectric layer 20 which is formed of a transparent synthetic resin such as, for example, polyethylene terephthalate (PETP), polyethylene, polystyrene or polyester. For example, the dielectric layer 20 is 20–30 μm in thickness. In using this display panel 10 in the present invention, the surface of the dielectric layer 20 becomes the front side. The surface of this dielectric layer 20 is used in an electrostatic development process described below.

A color image is displayed on the display panel 10 by the following process.

Figure 3:
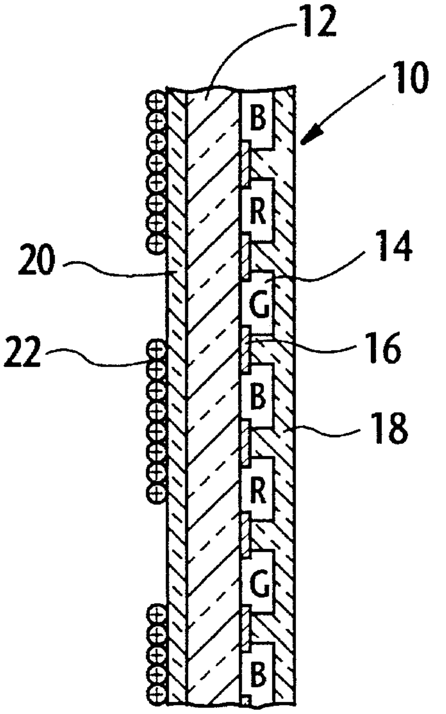
FIGS. 3 to 5 illustrate a process of displaying a color image on the display panel of FIG. 1.

Referring to FIG. 3, according to data of the color image to be displayed, the surface of the transparent dielectric layer 20 is electrostatically charged such that electric charges 22 (positive charges in this example) appear only in selected areas each of which is opposite to one of the color areas R, G, B. For simplicity, in the illustration the electric charges 22 are applied to areas opposite to the red and blue color areas R and B. The selective charging can be accomplished by using a conventional electrostatic head of either contact type or non-contact type.

Figure 4:
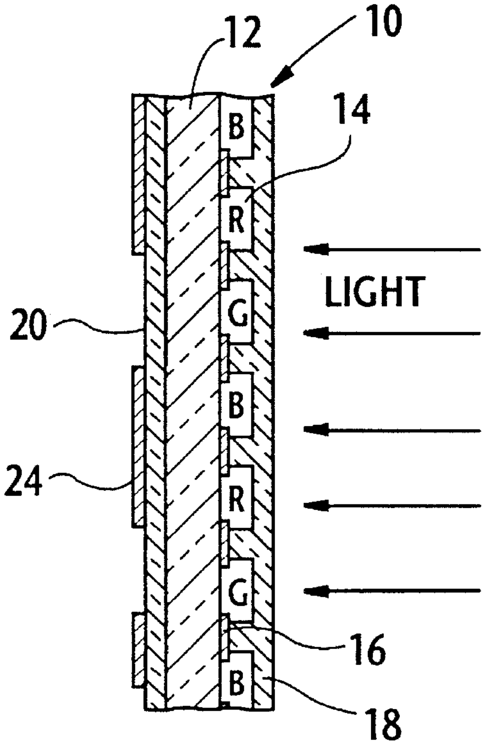

Next, as shown in FIG. 4, a black toner powder 24 is applied to the surface of the dielectric layer 20. In this case the toner is negatively charged before the application, so that the toner 24 adheres to the surface of the dielectric layer 20 only in the initially positively charged areas. That is, a toner layer 24 is formed except in areas Opposite to the green color areas G. In this process it is possible to use a black toner powder for conventional electrophotographic processes. Usually the toner powder is 7–12 μm in particle diameter and uses polyester, polystyrene or styrene-acryl copolyer as the main resin. In this process it is unnecessary to devote particular care to the thermal characteristics of the toner since the process does not include thermal fixing of the toner. In the toner application process it is preferable to produce an electric field between the charged surface of the dielectric layer 20 and a toner applicator (not shown in FIG. 4) by applying a bias voltage to the applicator since the electric field promotes accurate adhesion of the toner to the surface of the dielectric layer only in the initially charged areas.

In a modification of the above described process, the surface of the dielectric layer 20 is, for example, positively charged only in areas not to be covered with toner, and a positively charged toner powder is applied to the dielectric surface. As a result the toner adheres to the dielectric surface only in areas where electric charges are absent.

After applying the toner 24 the display panel 10 is illuminated, as illustrated in FIG. 4, from the back side on which the color pattern layer 14 exists. The backlight source can be selected, for example, from incandescent lamps, fluorescent lamps, light-emitting diodes and electroluminescent lamps. As the backlighted display panel 10 is viewed from the front side on which the toner layer 24 exists, green color appears in the display panel 10 since light transmitted through the red and blue areas R, B is shielded by the black toner layer 24.

Figure 5:
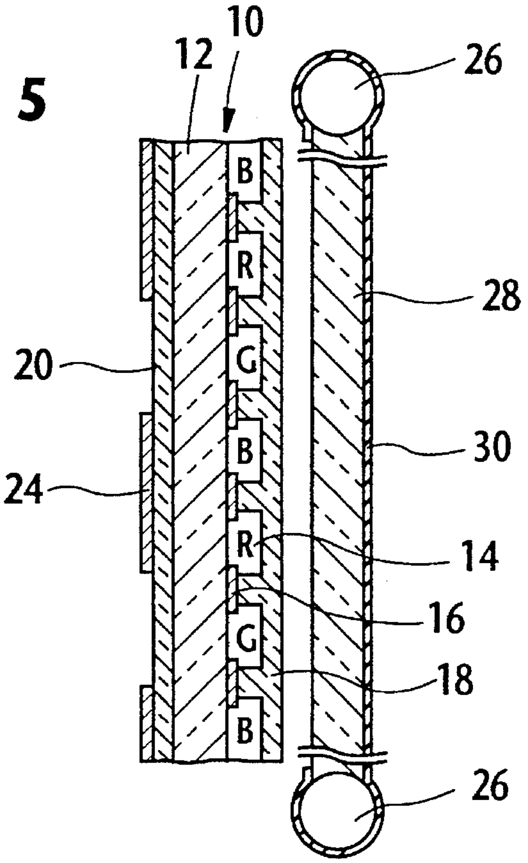

FIG. 5 shows the use of fluorescent lamps 26 (of cold-cathode type) for backlighting. Two fluorescent lamps 26 are arranged along two opposite ends of the display panel 10, and a transparent plate 28 of methacrylate resin is used as a light transmitting medium. The lamps 26 and the light transmitting plate 28 are covered with a reflector 30 to prevent leakage of light. To enhance the efficiency and uniformity of backlighting, it is optional to afford the light transmitting plate 28 with a light diffusing capability or to use a Fresnel lens or a set of thin transparent plates.

In this invention the display panel 10 is illuminated from the back side on which the color pattern layer 16 exists. So, the light source can be placed close to the color pattern layer 14. Therefore, when the display panel is viewed from the opposite side, light transmitted through the color areas over the toner layer 24 is invisible, and hence a very clear color image appears.

After the completion of displaying, the toner 24 adhering to the dielectric layer 20 is removed by a suitable mechanism having a cleaning brush or blade, and preferably residual electric charges on the dielectric layer 20 are removed by a discharge treatment. Then the display panel 10 becomes ready for the display of another image. The toner removed from the display panel can be recovered and reused in subsequent displaying operations. It is optional to omit the removal of toner and residual charges after a displaying operation and perform the removal immediately before starting a next displaying operation. There arises no problem in long leaving the toner 24 adhering to the display panel 10 in displaying operation or at rest. The surface of the protective layer 18 may also be cleaned and removed of residual electric charges in order to ensure clearness of subsequently displayed images.

Figure 6:
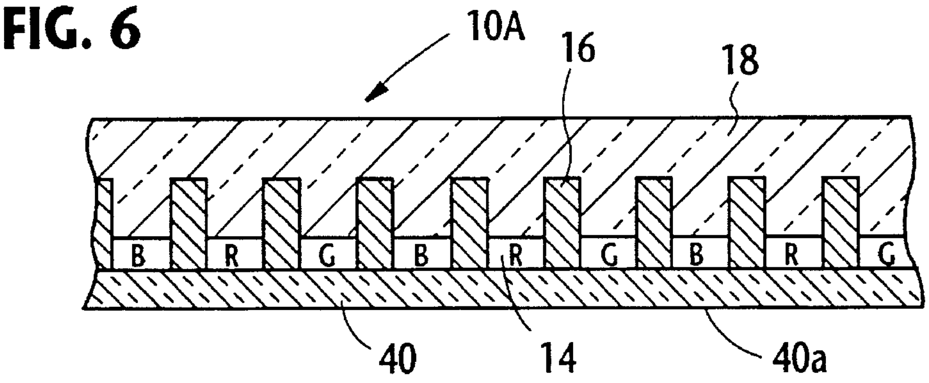
FIG. 6 is a cross-sectional view of a portion of another display panel used in this invention.
Figure 7:
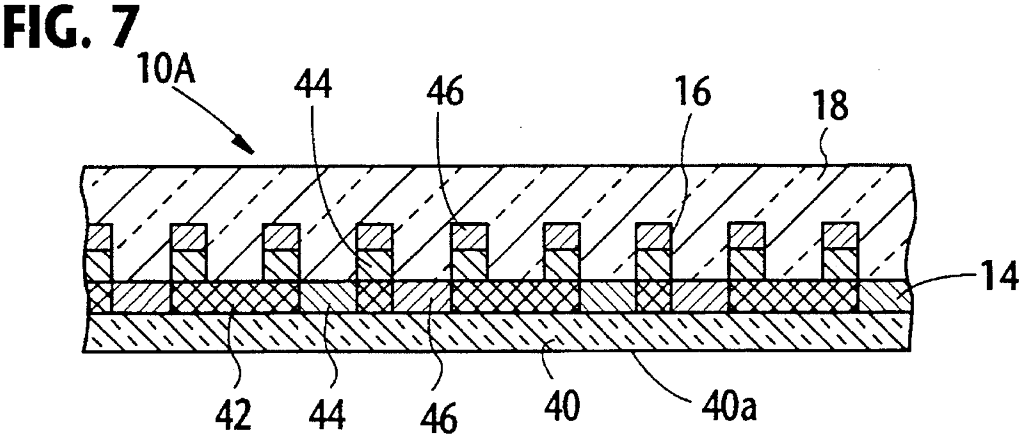
FIG. 7 shows the structure of opaque regions in the display panel of FIG. 6.

FIG. 6 shows the construction of another display panel 10A. In this display panel 10A, a transparent and dielectric resin sheet 40 such as a PETP sheet is used as the substrate. On one side of the resin substrate 40 there is a color pattern layer 14 which is divided into a great number of transparent color areas consisting of red color areas R, green color areas G and blue color areas B by opaque, black lines 16. In this example, the black lines 16 are formed by superposing red, green and blue color layers. Referring to FIG. 7, first a transparent red color layer 42 is selectively formed in areas to become the red color areas R and in narrow areas assigned to the black lines 16. Next, a transparent green color layer 44 is selectively formed in areas to become the green color areas G and also on the red color layer 42 in the areas assigned to the black lines 16. Next, a transparent blue color layer 46 is formed in areas to become the blue color areas B and also on the green color layer 44 in the areas assigned to the black lines 16. The superposition of the red, green and blue layers 42, 44, 46 gives an opaque, black coating (16). It is suitable to form the red, green and blue layers 42, 44, 46 by a printing method. The color pattern layer 14 including the black lines 16 is overlaid with a transparent protective layer 18. In this case the resin substrate 40 itself provides a dielectric surface 40*a* to be used in electrostatic development.

Figure 8:
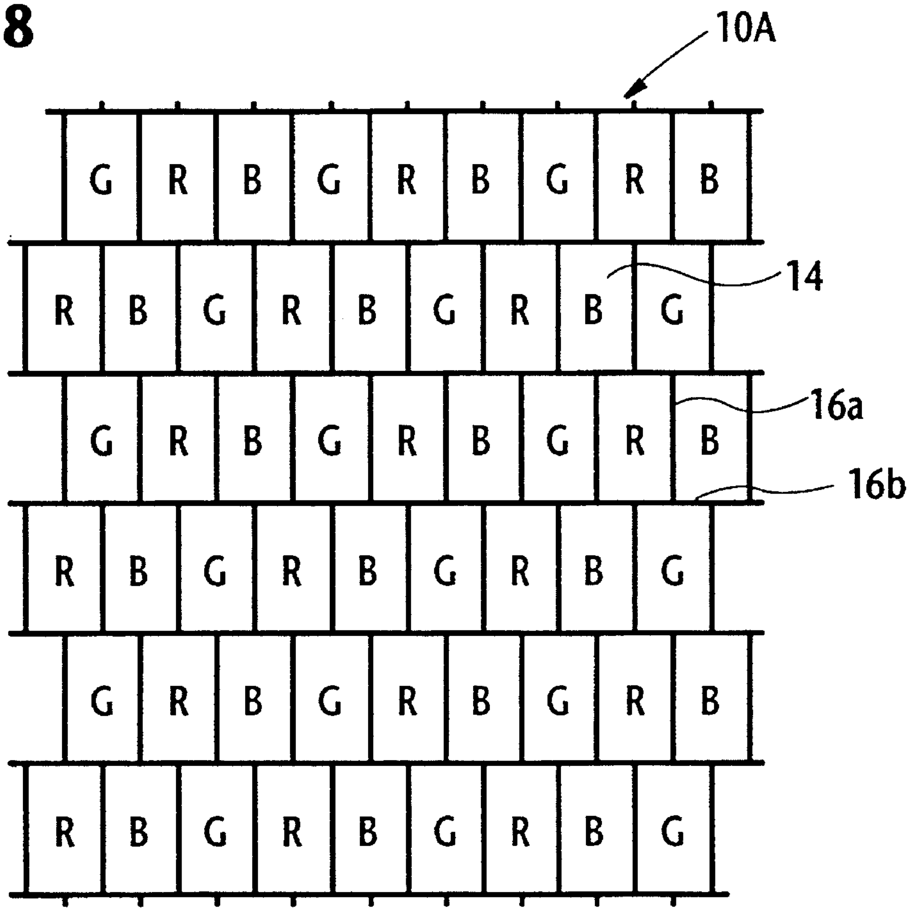
FIG. 8 shows an example of the color pattern of the pixels in the display panel of FIG. 6.

As shown in FIG. 8, in this example the transparent color areas R, G, B are rectangular areas arranged in a regularly repetitive triangular pattern. In the case of the mosaic pattern shown in FIG. 2 the longitudinal black lines 16*a* are continuous lines, but in the pattern shown in FIG. 8 the longitudinal black lines 14*a* are discontinuous. When the display panel 10A displays a color image, the discontinuous black lines 16*a* are inconspicuous by comparison with the continuous black lines.

Figure 9:
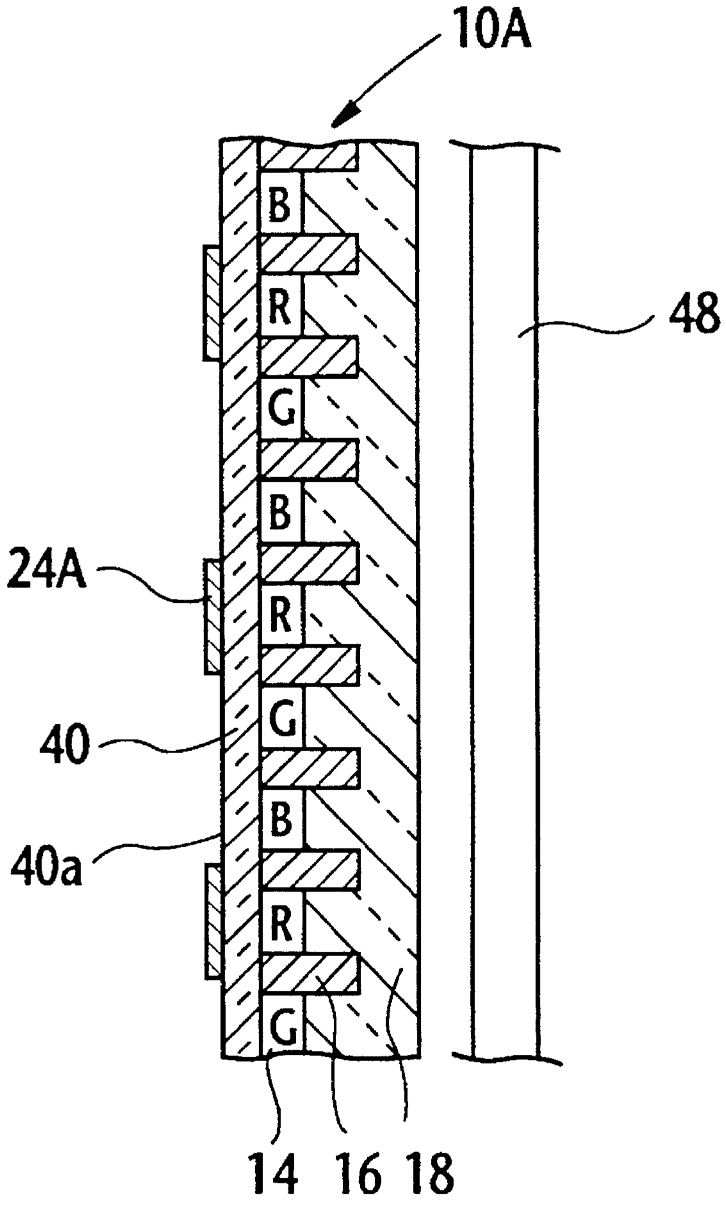
FIG. 9 illustrates the manner of displaying a color image on the display panel of FIG. 6.

The display panel 10A of FIG. 6 can be used in the same manner as the display panel 10 of FIG. 1. For example, FIG. 9 shows forming a toner layer 24A on the surface 40*a* of the dielectric substrate 40 only in areas opposite to the red color areas R. When the display panel 10A is illuminated by a backlight source 48, which is assumed to be an electroluminescent panel lamp, light passes through the display panel in areas where the green and blue color areas G, B of the color pattern layer 14 exist. So, viewing the display panel 10A from the front side, cyan color appears as a color mixture of green and blue.

In the case of the display panel 10A of FIG. 6 it is advantageous to use a gray toner instead of black toner. This is in view of a possibility that some toner particles might stick to or intrude into the plastic substrate 40 if the substrate surface 40 is locally damaged or toughened during repeated use of the display panel 10A. Even in such a case gray toner is not so conspicuous as black toner when the display panel is backlighted.

Figure 10:
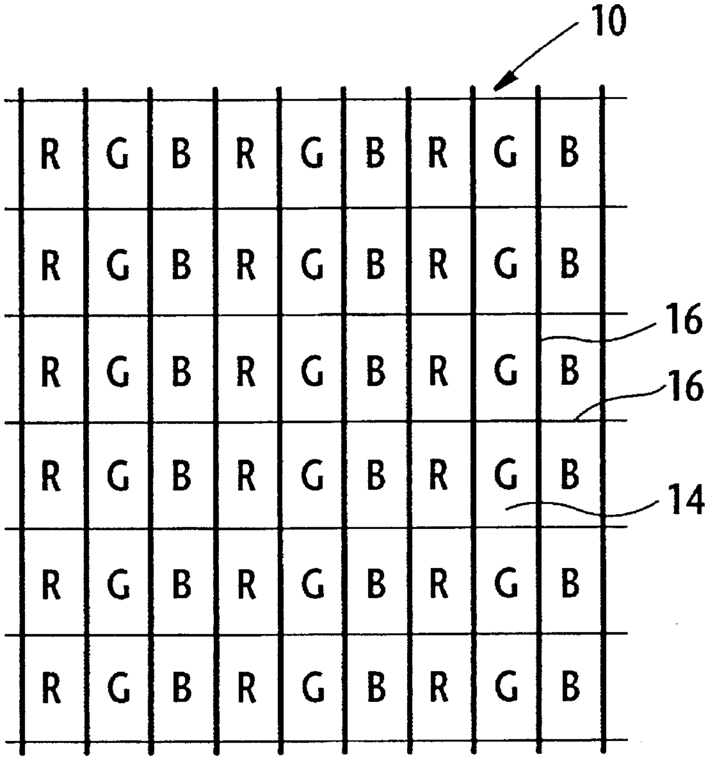
FIGS. 10 and 11 show two other examples of color patterns in the display panel of FIG. 1 or FIG. 6.
Figure 11:
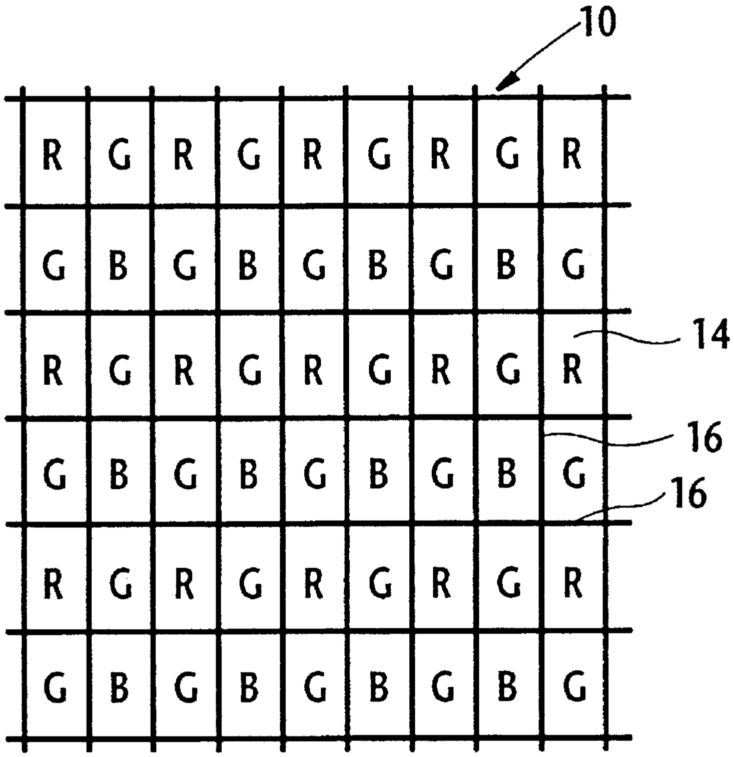

FIGS. 10 and 11 show further examples of the pattern of three primary color areas R, G, B in a display panel used in the invention. In the pattern of FIG. 10, the three color areas R, G and B respectively constitute stripes. In the pattern of FIG. 11, two color areas (R and G) or (G and B) are alternately arranged in each row and each file. It is possible to employ a still different pattern. Furthermore, it is optional to employ a combination of three colors other than the combination of red, green and blue, though the combination of the three primary colors is suited to the display of full color images. It is also possible to employ a combination of two colors or more than three colors.

In the foregoing examples a black or gray toner is used. It is possible to use a toner of a different color according to the combination of colors employed in the color pattern in the display panel. It is also possible to use liquid toner or viscous toner instead of powder toner, though powder toner is advantageous in the ease of removal from the display panel, and selection can be made from electrically conductive toners, insulating toners, magnetic toners and nonmagnetic toners. For application of toner to the display panel it is convenient to employ a one-component developing method, but it is also possible to employ a two-component developing method.

Figure 12:
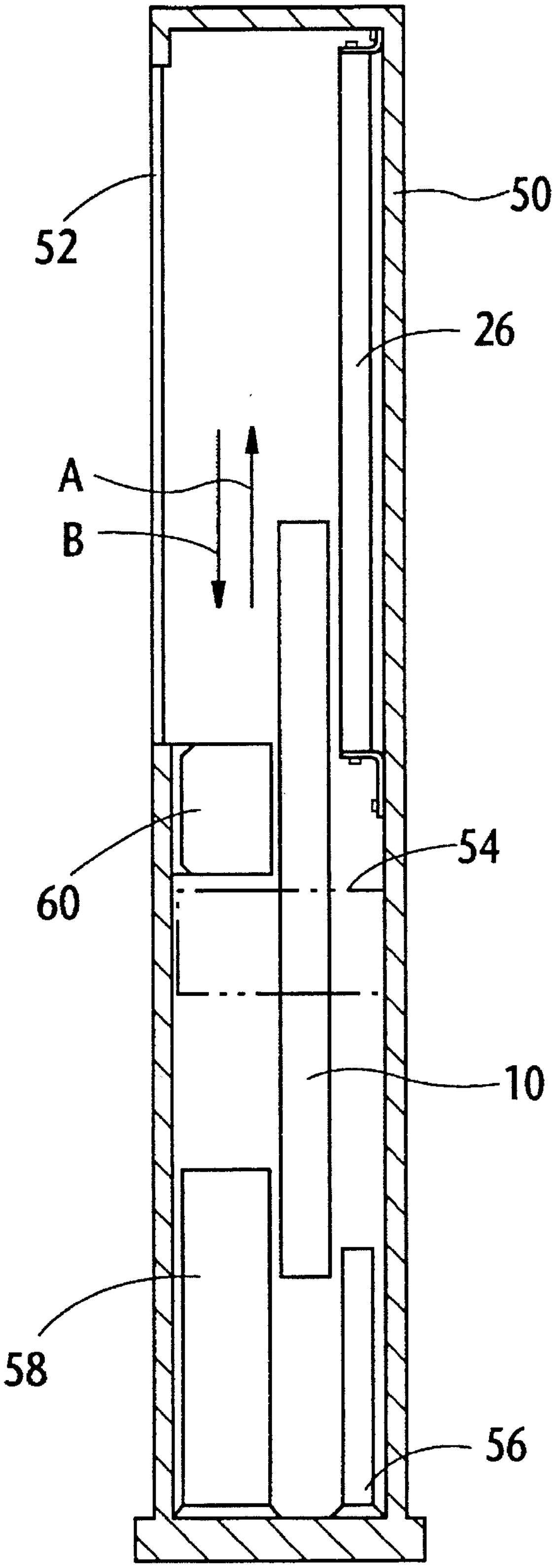
FIG. 12 is a schematic of a display apparatus embodying the invention in an elevational and partly sectional view.

As to image display apparatus, FIG. 12 shows a first embodiment of the invention. This apparatus uses the display panel 10 of FIG. 1.

In a case 50 having a display window 52 in an upper section, the display panel 10 is held on a plane parallel to the display window 52 by a carrier mechanism 54 which can move the display panel 10 both in the direction of arrow A and in the direction of arrow B and keep the panel 10 in a display position opposite to the display window 52 for a desired period of time. An image generator unit 60 is stationarily held at a short distance from the display window 52. As the backlight source, a pair of fluorescent lamps 26 are fixed to the inside of the upper section of the case 50 such that when the display panel 10 is moved to the display position the lamps 26 extend along the lateral ends of the display panel 10. A light transmitting plate (not shown in FIG. 12) is provided between the two lamps 26 as described hereinbefore with reference to FIG. 5. The apparatus includes a power supply 58 and an interface unit 56 via which image data is inputted to the image generator unit 60.

Figure 13:
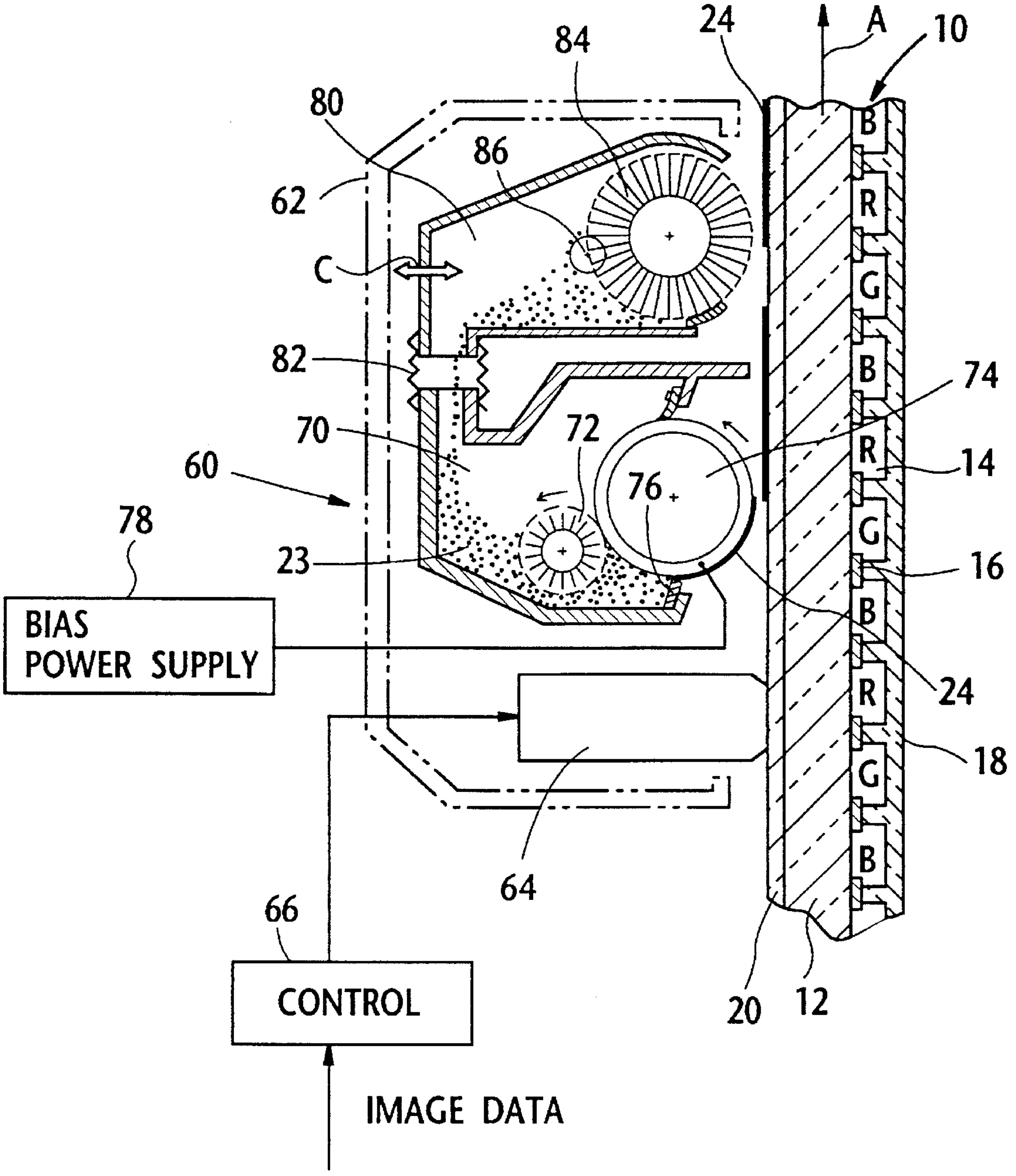
FIG. 13 is an elevational sectional view of an image generator unit in the display apparatus of FIG. 12.

FIG. 13 shows an example of the image generator unit 60. Enclosed in a case 62, the unit 60 includes an electrostatic head 64 to provide electric charges to the surface of the dielectric layer 20 of the display panel 10, a tonor applicator 70 to apply a black toner powder 23 to the surface of the dielectric layer 20 and a cleaner 80 to remove the toner from the display panel 10. The electrostatic head 64 is operated by a controller 66 which receives image data from the interface 56 in FIG. 12. The toner applicator 70 includes a rotary brush 72 and a rotary sleeve 74. By the rotation of the brush 72 the toner powder 23 is electrostatically charged and supplied to the surface of the rotating sleeve 74 to form a toner layer 24 on the sleeve surface. The thickness of the toner layer 24 is controlled by a thickness control blade 76. A bias voltage can be applied to the rotary sleeve 74 from a power supply 78. The cleaner 80 has a rotary cleaning brush 84 and a fixed rod 86 by which toner is detached from the rotating brush 84. The envelope of the cleaner 80 is connected to the envelope of the toner applicator 70 by a flexible pipe 82 in order to return the toner powder to the toner applicator 70. The cleaner 80 can be moved in lateral directions indicated by arrow C by a driving means (not shown) so that the cleaning brush 84 can be brought into contact with the surface of the dielectric layer 20 of the display panel 10 and can be detached from that surface.

In preparation for a displaying operation, the cleaning brush 84 is brought into contact with the display panel 10 and rotated, and the display panel 10 is moved in the direction of arrow B (downward) from the display position. The electrostatic head 64 and the toner applicator 70 are kept at rest. As the display panel 10 moves downward, the toner adhering to the display panel 10 is removed by the rotating cleaning brush 84.

When the display panel 10 arrives at the lowest position the cleaner 80 is detached from the display panel 10, and the display panel 10 is moved in the direction of arrow A (upward). At the same time the electrostatic head 64 and the toner applicator 70 begin operation. The electrostatic head 64 provides electric charges to the display panel 10 only in selected areas of the surface of the dielectric layer 20. As the display panel 10 moves upward, the black toner layer 24 on the surface of the rotating sleeve 74 is transferred onto the selectively charged surface of the display panel 10. This operation is completed before the arrival of the display panel 10 in the display position opposite to the display window 52. When the display panel 10 arrives at the display position, the panel 10 is kept stationary and backlighted by light from the lamps 26. As the backlighted display panel 10 is viewed through the display window 52, a color image appears by light passing through the color pattern layer 14 and the dielectric layer 20 in areas not covered with the toner layer 24. The displaying of the image continues until the lamps 26 are turned off. During displaying the image generator unit 60 is wholly kept at rest.

Figure 14:
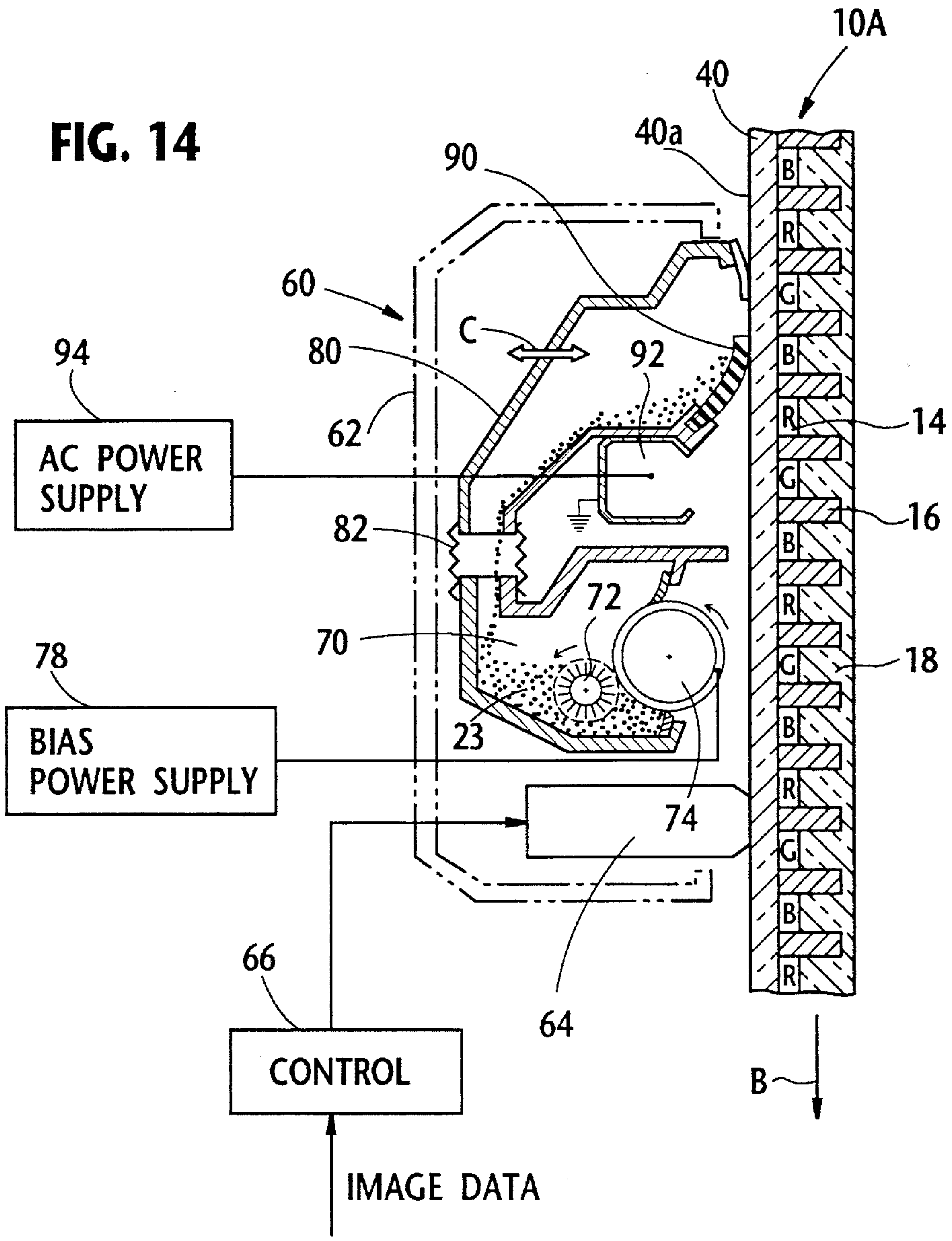
FIG. 14 shows, in an elevational sectional view, a modification of the image generator unit of FIG. 13.

FIG. 14 shows another example of the image generator unit 60. Together with the unit 60 the display panel 10A of FIG. 6 is shown by way of example. This unit 60 consists of an electrostatic head 64, a toner applicator 70 and a cleaner 80. The electrostatic head 64 and the toner applicator 70 are identical with the counterparts in the unit 60 of FIG. 13. The cleaner 80 has a cleaning blade 90 made of an elastic material such as polyurethane resin. The cleaner 80 can be moved in lateral directions indicated by arrow C so that the cleaning blade 90 can be brought into contact with the dielectric surface 40*a* of the display panel 10A and can be detached from that surface. The envelope of the cleaner 80 is connected to the envelope of the toner applicator 70 by a flexible pipe 82. The cleaner 80 includes a corona discharger 92 to which an AC voltage is supplied from a power source 94 to dissipate residual electric charges from the dielectric surface 40*a* of the display panel 10A. This image generator unit 60 is operated fundamentally in the same manner as the unit 60 of FIG. 13. Cleaning operation is performed while the display panel 10A is moving in the direction of arrow B by bringing the cleaning blade 90 into contact with the display panel and applying AC voltage to the corona discharger 92.

Figure 15:
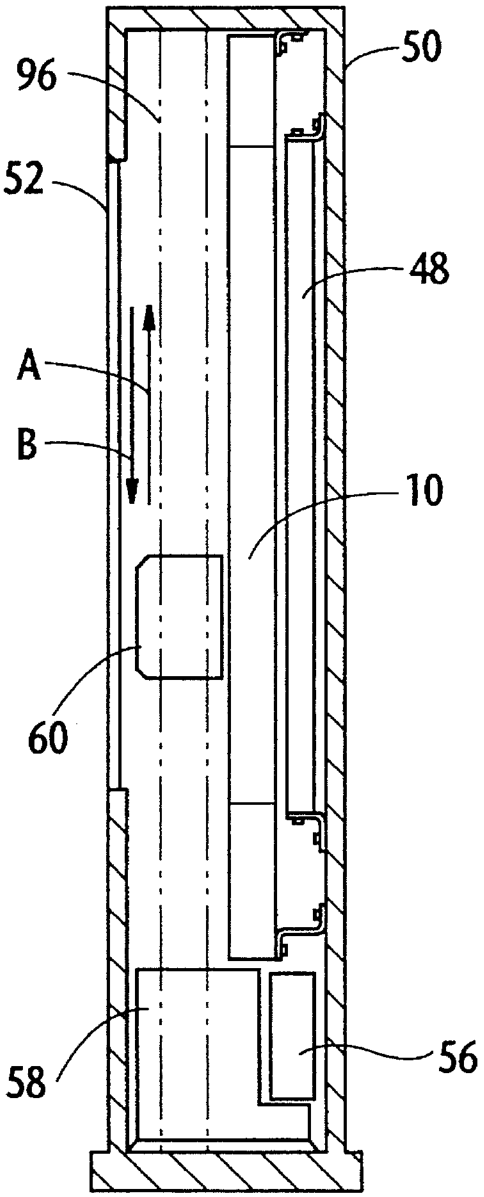
FIGS. 15 and 16 show two different modifications of the display apparatus of FIG. 12.

FIG. 15 shows a second embodiment of display apparatus according to the invention. This display apparatus is fundamentally analogous to the apparatus of FIG. 12. However, in this embodiment the display panel 10 (or 10A) is fixed in the case 50 in a position opposite to a display window 52 which is provided in a middle section of the case 50, and the image generator unit 60 is held by a carrier mechanism 96 which can move the unit 60 both in the direction of arrow A (upward) and in the direction of arrow B (downward). The backlight source, which is assumed to be an electro-luminescent panel lamp 48 that emits white light, is fixed to the inside of the case 50 in a position opposite to the display window 52. The image generator unit 60 is as shown in FIG. 13 or FIG. 14.

In this apparatus, cleaning operation is performed while the image generator unit 60 is moved upward and terminated when the unit 60 reaches the highest position. After that the unit 60 is moved downward, and both the electrostatic head and the toner applicator in the unit 60 are operated.

By comparison with the display apparatus of FIG. 12, the display apparatus of FIG. 15 can be made smaller in overall size because of not moving the display panel 10 which is a relatively large member.

Figure 16:
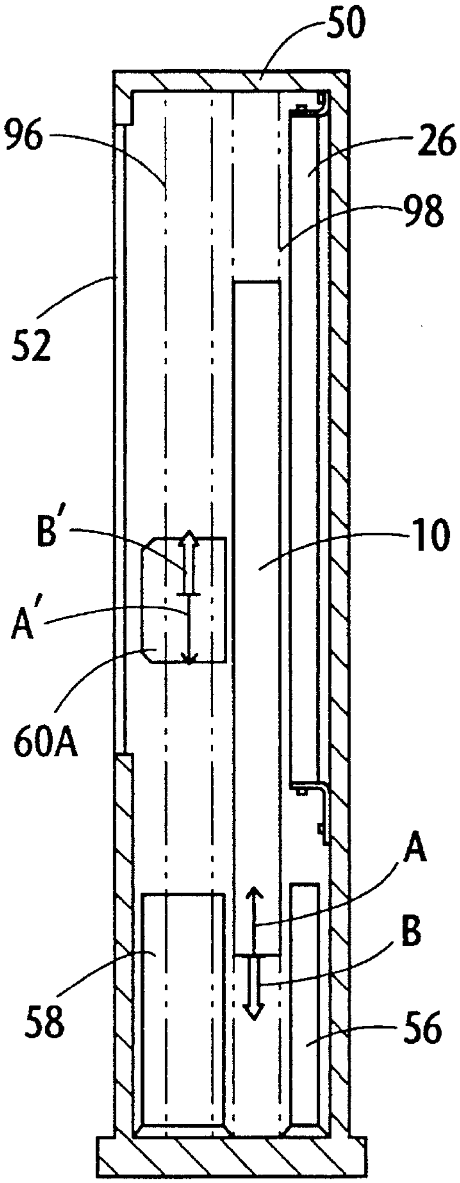

FIG. 16 shows a third embodiment of display apparatus according to the invention.

In a case 50 having a display window 52 in an upper section, the display panel 10 is held on a plane parallel to the display window 52 by a panel carrier mechanism 98 which can move the display panel 10 both in the direction of arrow A (upward) and in the direction of arrow B (downward) and keep the panel 10 in a display position opposite to the display window 52 for a desired period of time. An image generator unit 60A is held by a carrier mechanism 96 which can move the unit 60A both in the direction of arrow A' (downward) and in the direction of arrow B' (upward). The backlight source 26 is fixed to the inside of the case 50 in a position opposite to the display window 52. The apparatus includes an interface unit 56 via which image data is inputted to the image generator unit 60A and a power supply unit 58.

In this display apparatus the carrier mechanism 96 and 98 operate simultaneously so as to move the display panel 10 and the image generator unit 60A simultaneously but in opposite directions. That is, the image generator unit 60A is moved in the direction of arrow A' (downward) when the display panel 10 is moved in the direction of arrow A (upward) and in the direction of arrow B' (upward) when the display panel 10 is moved in the direction of arrow B (downward).

Figure 17:
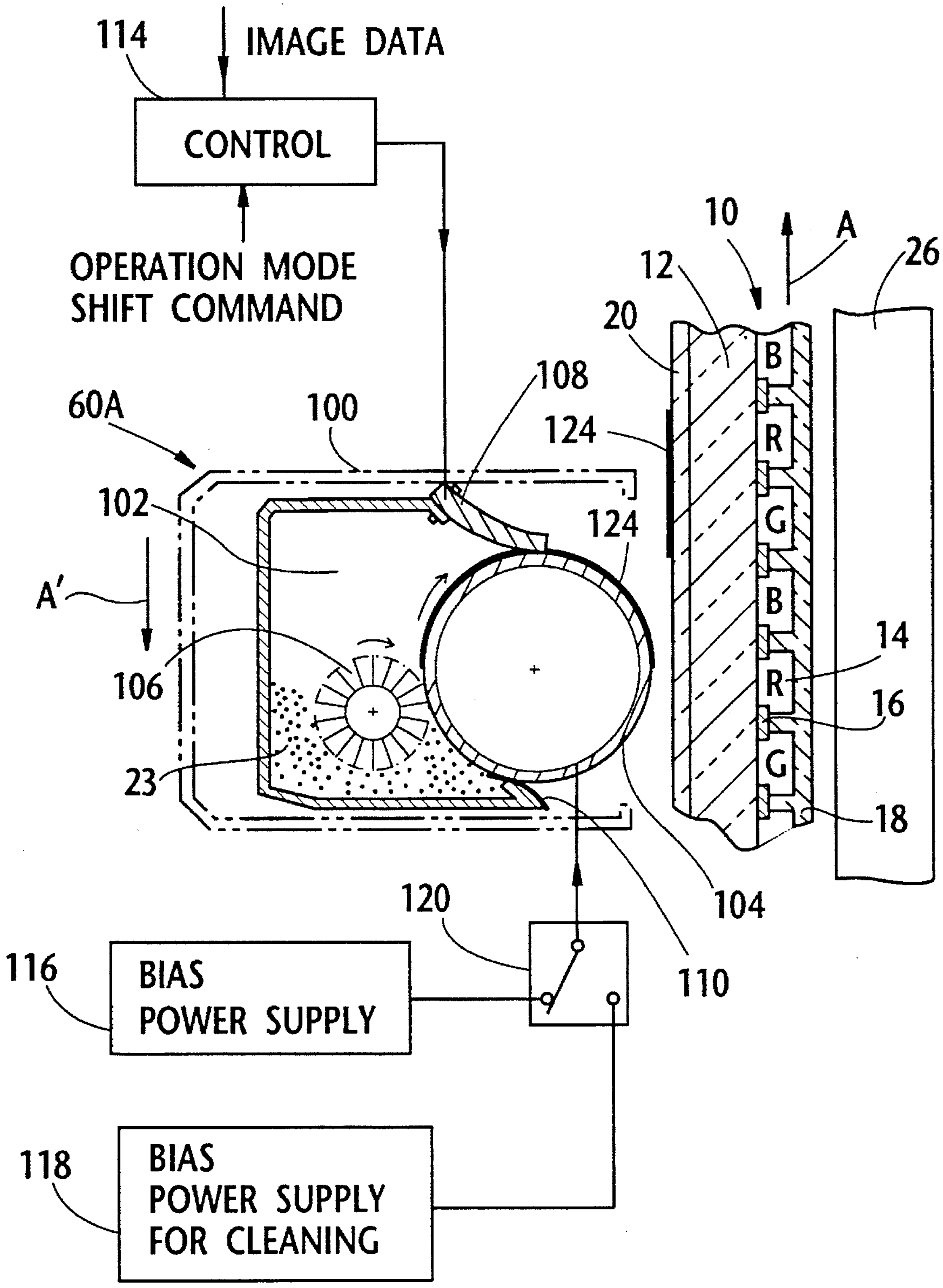
FIG. 17 is an elevational sectional view of an image generator unit used in the apparatus of FIG. 16.

FIG. 17 shows an example of the image generator unit 60A in FIG. 16. In a case 100 there is a toner chamber 102, and in an opening of the toner chamber 102 there is a toner transfer sleeve 104 which is a rotary sleeve. The toner chamber 102 is provided with a rotary brush 106 for electrically charging a black toner powder 23 and supplying the charged toner onto the cylindrical surface of the sleeve 104. A gap between the sleeve 104 and the bottom section of the toner chamber 102 is sealed by a film 110. In the upper section of the toner chamber 102 there is a development blade 108 which is in contact with the cylindrical surface of the sleeve 104. In the longitudinal direction of the sleeve 104, the development blade 108 is divided into a large number of electrically conductive regions and insulating regions alternating with each other, and controlled voltages can be selectively applied to the conductive regions from a controller 114 to which image data is supplid from the interface 56 in FIG. 16. To apply a bias voltage of selected polarity to the toner transfer sleeve 104, either of two power supplies 116 and 118 can be connected to the sleeve 104 via a changeover switch 120.

The image generator unit 60A can be operated as a cleaner to remove toner from the dielectric surface of the display panel 10. To perform cleaning operation the sleeve 104 is connected to the power supply 118 which provides a bias voltage suitable for attracting toner on the display panel 10 to the sleeve 104. At the same time the operation of the controller 114 is shifted to cleaning mode in order to apply a bias voltage to the development blade 108 for the purpose of preventing the toner in the compartment 102 from traversing the interface between the blade 108 and the sleeve 104. Then the display panel 10 is moved downward and the image generator unit 60A upward. At the end of the cleaning operation the display panel 10 is in the lowest position and the image generator unit 60A is in the highest position.

For displaying operation, the display panel 10 is moved upward and the image generator unit 60A downward. At the same time, the sleeve 104 is connected to the power supply 116 which provides a bias voltage suitable for transferring toner from the sleeve 104 to the display panel 10, and the operation of the controller 114 is shifted to development mode. According to the inputted image data, the controller 114 selectively applies controlled voltages to the conductive regions of the development blade 108 in order to control the electric field between the sleeve 104 and each conductive region of the blade 108. As a result, a toner pattern 124 necessary for the display of the aimed image is gradually formed on the surface of the rotating sleeve 104, and the toner pattern 124 is successively transferred onto the dielectric surface of the display panel 10 which is moving upward. The transfer of the complete toner pattern 124 is accomplished before the display panel 10 reaches the display position opposite to the display window 52. The display panel 10 is kept in the display position and illuminated by the backlight source 26, while the image generator unit 60A is kept in the lowest position and at rest.

Alternative to the above described development blade 108, it is possible to use a fixed sleeve which has a large number of thin stripe electrodes on the surface and contains a rotary magroll to control voltages applied to the respective electrodes.

It is possible to use the image generator unit 60 of FIG. 13 or FIG. 14 in the display apparatus of FIG. 16 in place of the unit 60A of FIG. 17. Also it is possible to use the image generator unit 60A of FIG. 17 in the display apparatus of FIG. 12 or FIG. 15 in place of the unit 60 of FIG. 13 or FIG. 14.

What is claimed is:

1. An image display apparatus, comprising:

a display panel which comprises a transparent substrate and a color pattern layer which is formed on one side of the transparent substrate and has a multiplicity of transparent pixel areas consisting of at least two separate sets of pixel areas in different colors which constitute a regularly repetitive pattern and a set of regularly arranged opaque areas by which each of the pixel areas is bordered;

means for applying an opaque coloring substance to the opposite side of the substrate of the display panel in areas opposite to selected pixel areas of the color pattern layer on the basis of externally supplied image data;

means for illuminating the display panel from the side on which said color pattern layer exists; and means for reciprocatively moving at least one of said display panel and said image generating means relative to the other.

2. An apparatus according to claim 1, wherein the applying means further comprises means for forming an electric charge pattern on said opposite side of the substrate of the display panel before applying said coloring substance, said substrate being dielectric at least in the surface on said opposite side.

3. An apparatus according to claim 2, wherein said coloring substance is a powder toner.

4. An apparatus according to claim 3, wherein said applying means further comprises means for removing the powder toner from the substrate of the display panel.

5. An apparatus according to claim 1, wherein said transparent color pattern layer has three separate sets of pixel areas which are respectively in red, green and blue colors.

6. An apparatus according to claim 1, wherein all the pixel areas are rectangular areas.

7. An apparatus according to claim 1, wherein said opaque band-like areas are black areas.

8. An apparatus according to claim 1, wherein said means comprises a rotary cylinder and means for forming a pattern of a powder toner on the surface of said rotary cylinder and transferring the pattern of the powder toner to said opposite side of the substrate of the display panel.

9. An apparatus according to claim 8, wherein said means further comprises means for attracting the powder toner from the substrate of the display panel to the surface of said rotary cylinder while said toner pattern transfer means remains inoperative.

10. An apparatus according to claim 1, wherein said moving means comprises means for moving the image generating means while the display panel is held stationary.

11. An apparatus according to claim 1, wherein said moving means comprises means for moving the display panel while the image generating means is held stationary.

12. An apparatus according to claim 1, wherein said moving means comprises means for moving the display panel and the image generating means simultaneously but in opposite directions.

* * * * *